(12) United States Patent
Zotti et al.

(10) Patent No.: US 12,156,075 B2
(45) Date of Patent: Nov. 26, 2024

(54) WIRELESS MESH NETWORK SYSTEM

(71) Applicant: SIGNIFY HOLDING B.V., Eindhoven (NL)

(72) Inventors: Teresa Zotti, Eindhoven (NL); Luca Zappaterra, Eindhoven (NL); Robert James Davies, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 418 days.

(21) Appl. No.: 17/602,842

(22) PCT Filed: Apr. 7, 2020

(86) PCT No.: PCT/EP2020/059912
§ 371 (c)(1),
(2) Date: Oct. 11, 2021

(87) PCT Pub. No.: WO2020/208027
PCT Pub. Date: Oct. 15, 2020

(65) Prior Publication Data
US 2022/0150758 A1 May 12, 2022

(30) Foreign Application Priority Data
Apr. 12, 2019 (EP) .................................... 19168816

(51) Int. Cl.
H04W 28/08 (2023.01)
H04W 28/02 (2009.01)
H04W 84/18 (2009.01)

(52) U.S. Cl.
CPC ... *H04W 28/0883* (2020.05); *H04W 28/0284* (2013.01); *H04W 84/18* (2013.01)

(58) Field of Classification Search
None
See application file for complete search history.

(56) References Cited

U.S. PATENT DOCUMENTS 8,295,181 B2  10/2012 Bradford et al.
9,246,809 B2   1/2016 Asati et al.
(Continued)

FOREIGN PATENT DOCUMENTS

| JP | 2006060322 A | 3/2006 |
| JP | 2006287463 A | 10/2006 |
| JP | 2012147324 A | 8/2012 |

OTHER PUBLICATIONS

M. Ha, et al., "Dynamic and Distributed Load Balancing Scheme in Multi-Gateway Based 6LoWPAN", Published in: 2014 IEEE International Conference on Internet of Things (iThings), and IEEE Green Computing and Communications (GreenCom) and IEEE Cyber, Physical and Social Computing (CPSCom), Date of Conference: Sep. 1-3, 2014 in Taipai, Taiwan, pp. 1-8.

*Primary Examiner* — Saad Khawar

(57) ABSTRACT

In order to provide a reliable interconnection between a wireless mesh network and an external network, more than one border router device may be deployed. A novel load balancing method, and the related system and devices, are disclosed in this invention. By embedding actual traffic load information in the frequency of sending the border router advertisements, automatic traffic load balancing among multiple border routers is realized in 5 the system, without extra signaling overhead or any change to the beacon packet structure.

12 Claims, 2 Drawing Sheets

(56) References Cited

U.S. PATENT DOCUMENTS

| | | |
|---|---|---|
| 2005/0157676 A1 | 7/2005 | Kwak et al. |
| 2006/0040663 A1 | 2/2006 | Ise et al. |
| 2006/0221927 A1* | 10/2006 | Yamada ................ G06F 21/606 370/345 |
| 2009/0147714 A1* | 6/2009 | Jain ................... H04W 52/0216 370/311 |
| 2015/0365326 A1* | 12/2015 | Le ......................... H04W 28/02 370/232 |
| 2017/0127402 A1* | 5/2017 | Kweon ................. H04W 72/51 |
| 2019/0014528 A1 | 1/2019 | Skillermark et al. |

* cited by examiner

WIRELESS MESH NETWORK SYSTEM

CROSS-REFERENCE TO PRIOR APPLICATIONS

This application is the U.S. National Phase application under 35 U.S.C. § 371 of International Application No. PCT/EP2020/059912, filed on Apr. 7, 2020, which claims the benefit of European Patent Application No. 19168816.7, filed on Apr. 12, 2019. These applications are hereby incorporated by reference herein.

FIELD OF THE INVENTION

The present invention is directed generally to a wireless mesh network and the interconnection to an external network. More particularly, various inventive methods, apparatus, systems and computer-readable media are disclosed herein.

BACKGROUND OF THE INVENTION

A wireless mesh network is a kind of network topology where (network) nodes may not only capture and disseminate its own data, but also serve as a relay for other nodes, that is, they may collaborate to propagate the data in the network. A mesh network can be designed to use a flooding technique or a routing technique. When using a routing technique, the message propagates along a path, by hopping from node to node until the destination is reached. There are several short-range wireless communication protocols supporting wireless mesh network, such as Wi-Fi, Zigbee, and Bluetooth Low energy (BLE).

Zigbee defines a suite of high-level communication protocols based on a physical layer (PHY) and a medium access control layer (MAC) according to IEEE 802.15.4, which is widely used to create a personal area network (WPAN) with small and low power digital radios, in the context of remote control, smart home and smart building automation.

As a competing technology in short range wireless communication or Wireless Personal Area Network (WPAN), BLE is designed by the Bluetooth special Interest Group (Bluetooth SIG) and is first unveiled in the Bluetooth core specification 4.0 in 2010. BLE is aimed to provide a novel solution to the applications such as healthcare, fitness, beacon, security, and home entertainments. As compared to the classic Bluetooth, BLE features an entirely new protocol stack that enables rapid build-up of simple links. Low power design is another highlight of the system, and a BLE system is intended to be powered by a coin cell battery.

At the same time, an IP network is a communication network that uses Internet Protocol (IP) to send and receive messages between one or more computers or smart electronic devices. As one of the most commonly used global networks, an IP network is implemented in Internet networks, local area networks (LAN) and enterprise networks. An IP network requires that all hosts or network nodes be configured with the TCP/IP suite. With the more and more connected devices in the Internet of Things (IoT) context, the IP network is also extending from original IPv4 address space to a highly scalable IPv6 address scheme.

To enable the interconnection between short range wireless communication networks towards IP networks, or to enable the widely distributed sensor nodes to access or get accessed via a backbone network or the cloud, the standardization organizations are also working on new features and new protocols to facilitate such inter-connection.

To enable IP connectivity between mesh nodes and devices not belonging to the wireless mesh such as cloud servers or smartphones, it requires the specification of the behavior of so-called Border router (BR) nodes. A BR provides an interface between the nodes implementing IP connectivity and other IP networks such that IP nodes can communicate with peers outside the mesh network (e.g., central controller nodes). The key functionality of a BR node is to connect the whole mesh network to the IP backbone. The BR has among other functionalities the capability to self-advertise its Border Routing capability within the network by sending beacon packets. To avoid a single point of failure and provide a load balancing capability, the system allows multiple BRs to be active at the same time.

SUMMARY OF THE INVENTION

In view of the above, the present disclosure is directed to inventive methods, apparatus, systems, computer program and computer-readable media for selecting a border router to connect to an external network. More particularly, various inventive computer-readable media (transitory and non-transitory), methods, systems and apparatus are provided to facilitate load balancing through the selection of a border router as a forwarding border router from multiple candidates.

A first aspect of the invention is a border router device for use in a wireless mesh network, arranged to connect the wireless mesh network to an external network. The border router device comprises a controller configured to determine a beacon-interval; a scheduler configured to determine a beacon-transmission time moment for sending a beacon packet periodically after each beacon-interval; a transceiver configured to transmit the beacon packet on a communication channel at the beacon-transmission time moment, and wherein the controller is further configured to determine the beacon-interval based on an available capacity of the border router, wherein the available capacity is related to an actual traffic load of the border router, the actual traffic load comprises reception of data packets with the border router as a destination in the wireless mesh network coming from the nodes in the wireless mesh network either via a direct link or via multi-hop relaying, transmission of data packets from the border router to the nodes in the wireless mesh network either via a direct link or via multi-hop relaying, and internal processing of said data packets; and wherein the higher the actual traffic load the lower the available capacity, and hence the longer the beacon-interval.

By controlling the beacon-interval according to the actual traffic load condition, load balancing can be implemented in the wireless mesh network without additional signaling handshake or any change to the original beacon packet structure. In case of a high traffic load, a first border router extends the beacon-interval, or in other words, it sends beacon packets less frequently, and hence fewer potential nodes in the surrounding will be invited to appoint the first border router as a forwarding border router. In contrast, a second border router with very light traffic load tends to send the beacon packets more frequently. Hence, more nodes will detect the beacon packets from the second border router, and may then select the second border router as a forwarding border router. In this way, the traffic load is balanced between the first and the second border router automatically.

In an embodiment, the border router may also purposely add a small, possibly (pseudo) random, deviation to the beacon-transmission time moment, similar to a dither effect, to avoid conflict(s) with other periodically transmitted signal (s) on the communication channel. The small time-deviation can be arranged in accordance to a typical size of a beacon packet or a data packet in the network. In this way, in a system with multiple border routers deployed with a high density, if by coincidence more than one border router adopts the same beacon-interval and schedules the same beacon-transmission time moments, they will not conflict all the time with the regular periodic transmission of the beacon packets.

In one embodiment, the controller of the border router is further configured to detect a potential conflict between a scheduled transmission of a beacon packet and a transmission of a data packet; to determine a delay to postpone the scheduled transmission of the beacon packet to avoid the potential conflict; and then the scheduler is further configured to adjust the beacon-transmission time moment according to the delay determined.

Since a beacon packet of a border router is used mainly to advertise the existence of the border router to the neighboring nodes, it can be of a lower priority as compared to data packets that might be related to a certain time-critical application. Therefore, it is important to avoid the situation that the transmission of the periodic beacon packets blocks the transmission or reception of a time-critical data packet. Conflict detection at the border router is used to figure out if there is any potential conflict between a scheduled beacon packet and the transmission of a data packet.

In another embodiment, the border router may comprise a second transceiver to support the wireless or wired connection with the external network, in case a different communication protocol is carried out on the external network other than on the wireless mesh network.

A second aspect of the invention is a node as claimed. A node for use in a wireless mesh network for seeking for a forwarding border router to an external network, comprises: a transceiver configured to monitor a communication channel; a controller configured to derive estimated beacon-intervals of at least two border routers, and to select one border router that has the shortest estimated beacon-interval out of the at least two border routers as the forwarding border router, with the forwarding border router as a destination in the wireless mesh network (800).

In order to facilitate load balancing, the border router regulates the beacon interval according to the actual traffic load at the border router side; as a counterpart, the node in the network should take such implicitly embedded load information into consideration when selecting a forwarding border router from multiple border router candidates.

In an embodiment, a wireless mesh network system comprises at least two border routers according to the first aspect of the invention, and at least one node according to the second aspect of the invention. The node is to select one border router as a forwarding border router out of the at least two border routers to an external network, and the devices, methods, computer program and computer-readable media as disclosed in this invention are to facilitate load balancing in the selection.

In another aspect, a method of a border router for use in a wireless mesh network is disclosed. The method comprises the steps of determining a beacon-interval based on an available capacity of the boarder router, wherein the available capacity is related to an actual traffic load of the border router, the actual traffic load comprises reception of data packets with the border router as a destination in the wireless mesh network coming from the nodes in the wireless mesh network either via a direct link or via multi-hop relaying, transmission of data packets from the border router to the nodes in the wireless mesh network either via a direct link or via multi-hop relaying, and internal processing of said data packets; and wherein the higher the actual traffic load the lower the available capacity, and hence the longer the beacon-interval; determining a beacon-transmission time moment for sending a beacon packet periodically after each beacon-interval; transmitting the beacon packet on a communication channel at the beacon-transmission time moment. Hence, actual traffic load condition at the border router side is used to control the beacon interval of the border router adaptively.

In an embodiment, the method further comprises the steps of detecting a potential conflict between a scheduled transmission of a beacon packet and a transmission of a data packet; determining a delay to postpone the scheduled transmission of the beacon packet to avoid the potential conflict; adjusting the beacon-transmission time moment according to the delay determined. In this way, the data communication is not affected due to a scheduled beacon transmission at the border router side.

In another embodiment, the beacon-interval is determined based on a comparison between the actual traffic load and a reference traffic load, and wherein the reference traffic load is set based on at least one of knowledge of historical traffic load, a predefined value set by the manufacturer, and a programmable value configured by the network or by the border router itself; and wherein a load indicator is derived from the comparison by using one of the following steps: setting the load indicator to a predefined first value if the actual traffic load is lower than or equal to the reference traffic load; setting the load indicator to a second value by applying one of a step-wise, a linear, a non-linear, or an exponential function to the predefined first value according to the ratio or the difference between the actual traffic load and the reference traffic load.

The assessment to determine the actual traffic load is low or high may depend on the maximum capacity of the border router, the situation of the network, such as the number of nodes in the system and the types of the applications are running by the nodes (high or low throughput). The border router may consider such a reference traffic load to make the assessment more objective.

In one example, the reference traffic load is set by historical traffic load information. In another example, the reference traffic is a predefined value, or a programmable value. The historical traffic load may be determined using average calculation, median calculation, or another statistic calculation method to characterize the typical traffic load profile, based on the actual traffic loads in the past over a certain time period, such as an hour, a day, a week, a month, or etc. The reference traffic load may also be set by a manufacturer as a predefined value, be configured as a programmable value by receiving a message via the network or configured by the border router itself. In one example, multiple border routers may align on a reference traffic load, which can be an average traffic load value among neighboring border routers over a certain period of time, and such a reference traffic load is communicated to all the neighboring border routers via the network. The benefit of this arrangement is that the assessment of the actual traffic load becomes more objective according to the entire system traffic load condition, and a potential prejudiced assessment at a single border router device is avoided.

In another embodiment, the beacon-interval is determined by multiplying a reference beacon-interval with the load indicator, and wherein the reference beacon-interval is set based on at least one of knowledge of historical beacon-interval, a predefined value set by the manufacturer, a programmable value configured by the network or by the border router, and remaining battery level of the border router. By introducing the parameter of reference beacon-interval, more flexibility can be implemented. For example, the border router can also adjust the beacon interval by setting a remaining battery-level dependent reference beacon-interval. If the border router confronts a low battery level, it intends to transmit the beacon packets less frequently, and as a result, less nodes will choose this border router as a forwarding border router. And hence, this method helps to extend the life time of the border router with a low battery level.

Advantageously, the reference beacon-interval is set by historical beacon-interval information. The beacon-interval may be determined using averaging, median calculation, or another statistic calculation method to characterize the typical beacon-interval value, based on the beacon-intervals adopted in the past over a certain time period, such as an hour, a day, a week, a month, or etc. The reference beacon-interval may also be set by a manufacturer as a predefined value, be configured as a programmable value by receiving a message via the network or configured by the border router itself. The reference beacon-interval may also be determined according to the remaining battery level at the border router. The lower the battery level, the longer the reference beacon-interval. And hence, the border router manages to extend its life time.

Another aspect of the invention is the method at a node as claimed. A method at a node for use in a wireless mesh network to seek for a forwarding border router to an external network, wherein the method comprises the steps of monitoring a communication channel; deriving estimated beacon-intervals of at least two border routers; selecting one border router that has the shortest estimated beacon-interval out of the at least two border routers as the forwarding border router, with the forwarding border router as a destination in the wireless mesh network.

In one example of the method, a transceiver configured to monitor a communication channel and to detect at least two beacon packets; the controller configured to determine if the at least two beacon packets are from more than one border routers, and wherein the transceiver is further configured to monitor the communication channel to detect at least two subsequent beacon packets from each of the at least two out of the more than one border router; and wherein the controller further configured to estimate, for each one of the at least two border routers, an estimated beacon-interval that indicates a time separation of the at least two subsequent beacon packets received from the same border router; and wherein the controller further configured to select one out of the at least two border routers with the shortest estimated beacon-interval as the forwarding border router.

In another example of the method, a controller configured to determine if the at least two beacon packets are all from a same border router and there is no second border router in the surrounding, the only border router is selected as a forwarding border router.

In another embodiment, wherein the method further comprises the steps of comparing the estimated beacon-intervals against a reference estimated beacon-interval; determining if the estimated beacon-intervals from the at least two border routers are all larger or smaller than reference estimated beacon-interval; selecting randomly one border router out of the at least two border routers as the forwarding border router, if the estimated beacon-intervals from the at least two border routers are all larger or smaller than reference esti-mated beacon-interval; and wherein the reference estimated beacon-interval is based on at least one of knowledge of historical estimated beacon-interval, a predefined value set by a manufacturer, a programmable value configured by the network or by the node itself, and a value detected in the beacon packet.

The automatic adjustment of the load balance in the wireless mesh network, as disclosed above, may take some time to reflect on the actual traffic load at a certain border router side. In other words, there might be a delay in such a control loop. To avoid overshoot, especially when the at least two estimated beacon-intervals are very close to each other, it may not be always beneficial to choose the border router with the shortest estimated beacon-interval. Instead, when the at least two estimated beacon-intervals fall in the same range as compared to a reference estimated beacon-interval, to choose a border router randomly may be more advantageous to keep a more stable control loop in the system.

Preferably, the reference estimated beacon-interval is set by historical estimated beacon-interval information. The historical estimated beacon-interval may be determined using averaging, median calculation, or another statistic calculation method to characterize the typical estimated beacon-interval profile, based on the calculated estimated beacon-interval in the past over a certain time period, such as an hour, a day, a week, a month, or etc. The reference estimated beacon-interval may also be set by a manufacturer as a predefined value, be configured as a programmable value by receiving a message via the network, be configured by the node itself or a value detected in one of the beacon packets received. If the beacon packet structure has the freedom to embed the information on the reference beacon-interval, upon receiving information and the estimated beacon-interval of a certain border router, a node can easily figure out if the border router is over-loaded or not, and then the selection becomes more straight-forward at the node side.

Preferably, if the estimated beacon-intervals from the at least two border routers are all larger or smaller than reference estimated beacon-interval, the selection of one border router as a forwarding border router can be implemented with a pseudo-random procedure, such as choosing the border router from which the node received the beacon packet first, or choosing the border router from which the node received the beacon packet later than the others, or choosing alternately the border router from which the node received the beacon packet the first place, second place, and etc. The pseudo random procedure can also be implemented by the node to generate a pseudo random number first, and mapping the pseudo random number to a certain index or sequence number, and to choose the border router with the corresponding index or sequence number related to the border router identification, or the index or sequence related to the reception of the beacon packet from the border router. The pseudo random procedure can also be a combination of the one or more methods as described above.

In one embodiment, if there are more than two subsequent beacon packets received from the same border router, the estimated beacon-interval is derived based on an average calculation or a median calculation of the time separations between adjacent beacon packets received from the same border router. Depending on the time duration spent by the node on channel monitoring and the actual beacon-intervals of the border routers in proximity, the node may capture more than two beacon packets from a same border router. The more beacon packets the node receives, the better or more accurate estimation on the beacon-interval can be made by the node. The average calculation or a median calculation of the time separations between adjacent beacon packets helps to filter out any deviation that the border router made on the beacon transmission, such as due to extra delay adopted to avoid a potential conflict with a data packet.

In another embodiment, the method at the node to select a forwarding border router may also comprise the steps of selecting one border router as the forwarding border router by considering at least one additional criterion from a list of criteria comprising (a) the number of hops on the route from the sensor node to the border router, (b) the average link quality of the route between the sensor node and the border router, (c) the lowest link quality on the route between the sensor node and the border router, (d) the average remaining battery level on the route between the sensor node and the border router, (e) the lowest remaining battery level on the route between the sensor node and the border router.

The load balancing mechanism on selecting a forwarding border router as disclosed can also be used in combination with other criteria in a routing algorithm. Load balancing is beneficial from the entire system perspective. For an individual node, the best selection may also be related to the application requirements, such as end-to-end delay, SNR and maximum supported data rates on the route. Therefore, it is preferred that under certain circumstance one or more additional criteria are considered as well in the selection.

The invention may further be embodied in a computer program comprising code means which, when the program is executed by a computer, cause the computer to carry out the method of the border router device.

The invention may further be embodied in, a computer program comprising code means which, when the program is executed by a computer, cause the computer to carry out the method of the node device.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Various embodiments of the present invention will now be described based on a wireless mesh network system 100 with at least two border routers 200 and at least one node 300. Border router (BR) devices are deployed to connect nodes in a wireless mesh network to an external network, such as an IP backbone. To avoid a single point of failure, more than one BRs may be located in proximity to provide a more reliable interconnection between the wireless mesh network and the external network. For a node in the wireless mesh network, understanding which BR is currently more busy and which BR has the capacity to handle additional traffic is a very useful insight which allows a transmitting node to deliver its traffic towards a BR which is less busy.

Thus, applicants have recognized and appreciated that it would be beneficial to implement traffic load balancing in the system implicitly without introducing extra signaling overhead. In view of the foregoing, various embodiments and implementations of the present invention are directed to enabling automatic load balancing in selecting one forwarding border router out of multiple border routers in a wireless mesh network system.

Figure 1:
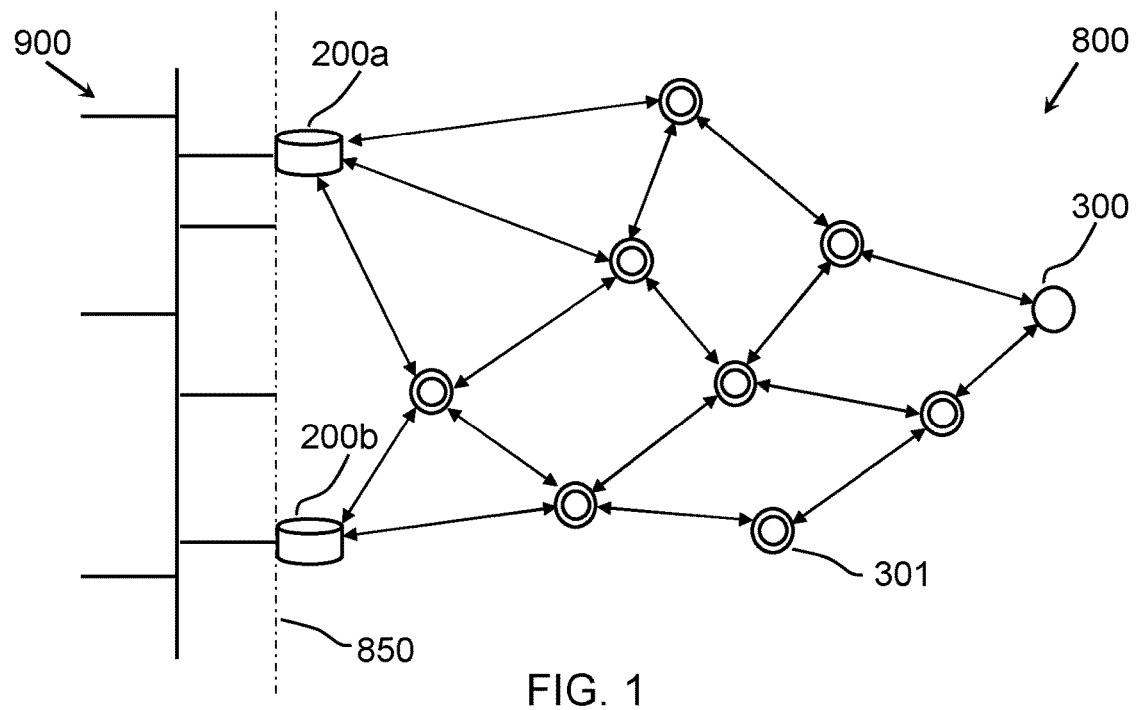
FIG. 1 shows a high-level overview of a node in a wireless mesh network seeking for a forwarding border router to connect to an external network.

FIG. 1 shows a high-level overview of the system as disclosed in the present invention. A node 300 in a wireless mesh network 800 intends to get connection to an external network 900, with the help of multiple intermediate relay nodes 301 and a forwarding border router. In this example, there are two border routers, 200a and 200b, available in the system. To select one forwarding border router out of multiple potential candidates, various embodiments of devices, methods, computer program and computer-readable media are disclosed in this invention to facilitate load balancing in the selection.

Different communication protocols may be supported in the wireless mesh network, such as Wi-Fi, Zigbee, Z-wave, Thread or BLE. The external network can be an IP backbone network, a cellular network, or a long-range communication network. The dash line 850 represents the virtual boundary between a wireless mesh network and an external network. The node 300 can be a sensor node, a resource-restricted node, a leaf node, a parent node, or a node with full functionality, such as a relay or router node. The distinction made in FIG. 1 between the node 300 and the relay or router nodes 301 is not intended to exclude the possibility that the node 300 is a same node as a relay node 301, but to make it clear that the node 300 is the source node with data packets to be forwarded to the external network. And hence, it is necessary for the node 300 to select a forwarding border router as a destination in the area of the wireless mesh network. It is also not necessary that the node is connected to the border router via several intermediate relaying nodes, and the node may also be located with just one hop distance from the border router.

Figure 2:
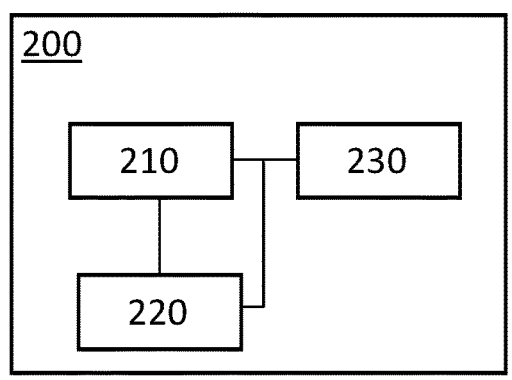
FIG. 2 schematically depicts example components of a border router device.

FIG. 2 schematically depicts example components of a BR device. As a very basic setup, the border router device 200 comprises a controller 210, a scheduler 210, and a transmitter 230. The controller is configured to determine a beacon-interval based on an actual traffic load. The scheduler 220 is configured to determine the actual beacon-transmission time moment according to the determined beacon-interval, and to provide the information to the transceiver 230 which actually transmits the beacon packets on a communication channel in the wireless mesh network. In practice, the border router may implement the controller using a processor and a memory, the border router may also include additional components such as a user interface, a second transceiver to support the wireless or wired connection with the external network.

Figure 3:
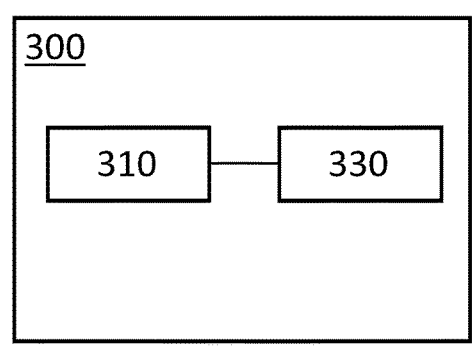
FIG. 3 schematically depicts example components of a node device.
Figure 4:
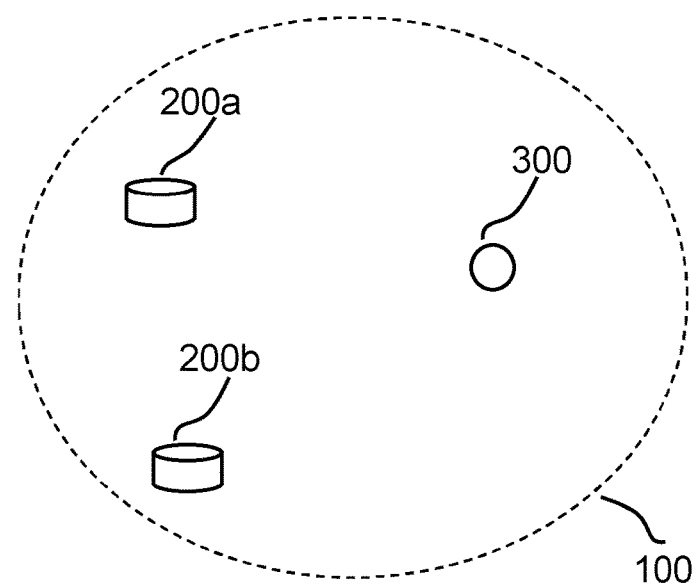
FIG. 4 shows a schematic architecture of a wireless mesh network system with at least two border router devices and a node device.

FIG. 3 schematically depicts example components of a node device. As disclosed above, the node can be a sensor node, a resource-restricted node, a leaf node, a parent node, or a node with full functionality. FIG. 3 gives an illustration of the basic setup of the node device which comprises a controller 310 and a transceiver 330. Similar to the border router device, the node device may also comprise further components, such as a processor, a memory, and/or a user interface.

The transceiver 330 is configured to monitor the communication channel in the wireless mesh network to capture beacon packets from a border router directly, or via one or multiple relaying nodes. Based on a received beacon packet, the node can know about the existence of the border router. If the beacon packet is received at the node via relaying nodes, the node may also know about the number of hops in the route between the border router and itself, and the link quality along and/or of the route. By monitoring the channel for a certain period of time, the node may detect more than one beacon packet from the same border router, and the controller is configured to derive the estimated beacon-interval of that border router. If the node is able to derive estimated beacon-intervals of at least two border routers, it will select a border router as the forwarding border router that has the shortest estimated beacon-interval. Hence, the node device is cooperating with the border router devices to facilitate the load balancing among multiple border routers.

In one case, if there is only one border router available in the system, the node detects the beacons from the only candidate, and hence the only beacon-interval represents also the shortest beacon-interval. It is also possible that the node fails to capture beacon packets from a second border router, then too it will select the only border router without further deriving the estimated beacon-interval.

Alternatively, if the node is a resource-restricted node and it cannot spend a longer time on channel monitoring, it may just choose the forwarding border router from which it receives a first beacon packet, without monitoring the communication channel to detect a second beacon packet. Furthermore, if the node is a resource-restricted node with a very low duty-cycling, which means the node stays in the sleep mode most of the time and only wake up occasionally due to the limited resource (e.g. limited battery capacity), it may just choose a forwarding border router based on previous knowledge, such as the border router from a last connection, without first monitoring the channel to detect a beacon packet. Another possibility is that there is a parent node of such a resource-restricted node, and then although the resource-restricted node is the actual source node with data packets to be transmitted to the external network, the parent node will implement the methods as disclosed in this invention to choose one forwarding border router on behalf of the resource-restricted node. Therefore, in a heterogeneous wireless mesh network with resource-restricted node, function-restricted node and full functional node, it can happen that the disclosed systems and methods to facilitate load balancing are only implemented by a subset of the nodes in the network.

Figure 5:
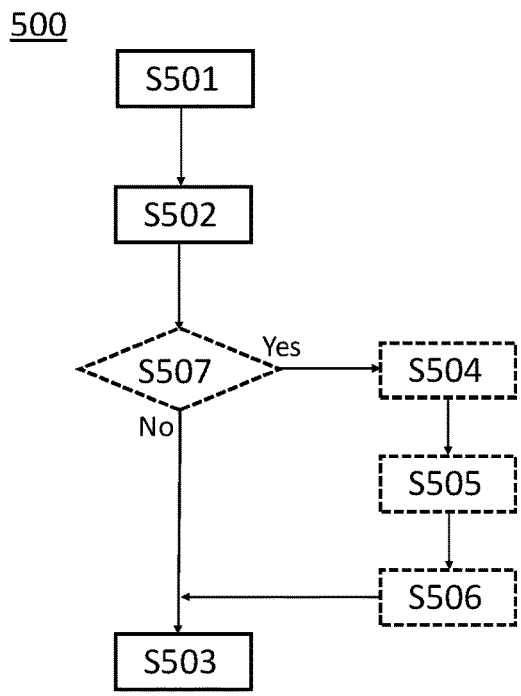
FIG. 5 shows a flow diagram of a method carried out at a border router device side.

FIG. 5 shows a flow diagram of a method 500 carried out at a border router device side. According to the actual traffic load, the border router device determines in step S501 a beacon-interval. Consider as an example, a BR that is busy with routing too many packets from the nodes in the wireless mesh network towards the external network and/or vice versa, and hence the actual traffic load is high. In line with the invention, the border router will have to advertise itself, or send the beacon packets, with a lower frequency or a longer beacon-interval. Conversely, when a BR has lower load and it has more capacity to forward traffic to a destination outside of the mesh, it will have to advertise itself, or send the beacon packets, with a higher frequency or shorter beacon-interval. By transmitting the beacon packets more or less frequently depending on the actual traffic load, a border router may manage to impact its future traffic load by inviting more or less nodes to select itself as a forwarding border router.

It is also disclosed that, in order to limit unnecessary traffic resulting from beacon packets, which have implicitly been given the role of signaling packets, the determined beacon-interval may be subject to a certain limit, which means that even if the BR is in idle mode, it should not send the beacon packets too frequently, such as with a beacon-interval smaller than the certain limit. A BR sending beacon packets with an interval equal or close to that limit may be assumed to be lightly-loaded, or even idle. In contrast, a BR sending beacon packets with much longer interval as compared to the certain limit, may be assumed to be heavily-loaded or overloaded. Such a limit may be a predefined value set by the manufacturer, a programmable value set by the network, or by the border router itself.

In step S502, the actual beacon-transmission moments for periodic beacon transmission are determined according to the beacon-interval. Given that a border router device is employed mainly for relaying data packets back and forth between a wireless mesh network and an external network, it can happen that the transmission of a beacon packet may conflict with a data packet transmission on the same air interface. Therefore, the border router may decide in step S507 if a conflict detection should be carried out. If yes, then the method carried out by the border router further comprises the step S504 to detect a potential conflict between a scheduled transmission of a beacon packet and a transmission of a data packet, and the step S505 to determine a delay to postpone the scheduled transmission of the beacon packet to avoid the potential conflict. And then in step 506, the beacon-transmission time moment is adjusted according to the determined delay. Therefore, the normal data communication or relaying at the border router is not affected due to a scheduled beacon transmission. Of course, it can also happen that if the data packet is of very low priority, such as sensing data with very relaxed timing requirement, the controller may be arranged to apply the delay to the scheduled transmission of the data packet, instead of the beacon packet. And hence, the beacon packet can be transmitted as originally scheduled, and no adjustment to the beacon-transmission time moment is needed. In step S503, a beacon packet is transmitted according to the beacon-transmission time moment, with or without additional adjustment due to the detection of a potential conflict.

Note that the concurrent packet transmission on two different air interfaces will not result in a conflict, as described above. For example, a border router typically can handle concurrent communication with the external network and with the wireless mesh network; but not two concurrent communication within the same network.

In one scenario, the border router may also purposely add a small, possibly (pseudo) random, deviation to the beacon-transmission time moment, similar to a dither effect, to avoid conflict(s) with other periodically transmitted signal(s) on the communication channel. The small time-deviation can be arranged in accordance to a typical or maximum size of a beacon packet or a data packet in the network. In this way, in a system with multiple border routers deployed with a high density, if by coincidence more than one border router adopts the same beacon-interval and schedules the same beacon-transmission time moments, they will not conflict all the time with the regular periodic transmission of the beacon packets. This will also help if multiple border routers are in an idle mode or lightly loaded, and more than one border router in the neighborhood sets the beacon interval to the same minimum limit as disclosed above. Without applying a dither effect to the beacon-transmission moment, it might also be difficult for the multiple border routers to identify the repeated conflicts with another border router.

For a border router the assessment that the actual traffic load is low or high can sometimes be subjective, although the maximum capacity of a border router is a given. To make the assessment more objective, in another example, the beacon-interval is determined based on a comparison between the actual traffic load and a reference traffic load, and the reference traffic load is set based on at least one of knowledge of historical traffic load, a predefined value set by the manufacturer, and a programmable value configured by the network or by the border router itself. The historical traffic load may be determined using average calculation, median calculation, or another statistic calculation method to characterize the typical traffic load profile, based on the actual traffic loads in the past over a certain time period, such as an hour, a day, a week, a month, or etc. Advantageously, the historical traffic load can also reflect the typical traffic load variation during this time of the day, e.g. on a per hour basis, during the day, during the week, or cross the seasons. And hence, by using a look-up table to store several values to capture such variations, the beacon-interval derived thereof can also be customized to the typical traffic load of the node and/or network.

Based on the comparison between the actual traffic load and the reference traffic load, a load indicator can be derived, which can be related to a ratio between the actual traffic load and the reference traffic load. In another scenario, the beacon-interval is determined by multiplying a reference beacon-interval with the load indicator. The reference beacon-interval is set based on at least one of knowledge of historical beacon-interval, a predefined value set by the manufacturer, a programmable value configured by the network or by the border router, and remaining battery level of the border router. By introducing the parameter of reference beacon-interval, more flexibility can be implemented. For example, the border router can also adjust the beacon interval by setting a remaining battery-level dependent reference beacon-interval. If the border router experiences a low battery level, it intends to transmit the beacon packets less frequently, although it may be expected to transmit the beacon packets more frequently given the actual traffic load condition. As a result, the border router will need to forward a data packet only when it is really necessary, and hence it helps to extend the border router's battery-life. The duration of the beacon interval is therefor an indicator of the willingness and/or capacity of the border router to accept additional traffic, the shorter the beacon interval the more willing to accept additional traffic. Wherein capacity can be the available capacity in view of traffic load or device restrictions. In another option, the reference beacon-interval is communicated by the BR either via the beacon packets or a separate message, and this can enable BRs to agree amongst themselves, perhaps dynamically, a reference beacon-interval according to, for example, the number of BRs available or network-level traffic condition or other relevant information.

Figure 6:
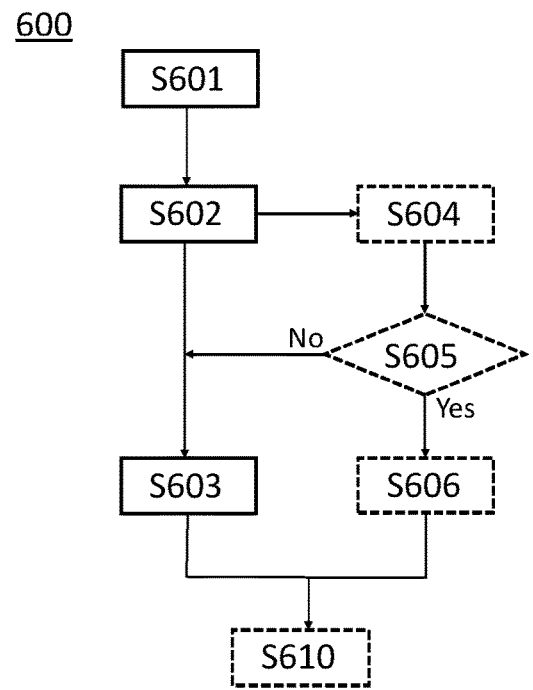
FIG. 6 shows a flow diagram of a method carried out at a node device side.

FIG. 6 shows a detailed flow diagram of a method carried out at a node device side. In step S601, the node monitors a communication channel to detect an advertisement or a beacon packet from a border router in the network, either directly or via one or multiple relaying nodes. With a beacon packet received, the node knows about the existence of one or more border routers in the system, the network identifier (ID) of the one or more border routers, and possibly the number of hops from a certain border router to itself, and the link quality of and/or along the route. The node derives in step S602 estimated beacon-intervals of at least two border routers, and then in step S603 selects one border router out of the at least two border routers as the forwarding border router that has the shortest estimated beacon-interval, which indicates that border router is willing to accept more packets.

In another example of the method, the node first monitors the channel for a certain period of time and captures multiple beacon packets all from a single border router. Then, that border router is selected as a forwarding border router.

In another scenario, the node may compare, as in optional step S604, the estimated beacon-intervals against a reference estimated beacon-interval, and then make the decision in step S605, if the estimated beacon-intervals from multiple border routers are all larger or smaller than reference estimated beacon-interval. If yes, in step S606, the node may select randomly one border router out of the multiple border routers as the forwarding border router; otherwise, the node still selects the border router with shortest estimated beacon-interval as the forwarding border router. This option helps to avoid overshoot in the system, especially when the multiple estimated beacon-intervals are very close to each other, it may not always be beneficial to choose the border router with the shortest estimated beacon-interval, given the delay it may take from implementing the disclosed method to really affect its future traffic load. Such latency may also be taken into account, by setting the beacon interval in a more conservative manner to prevent an in-rush off traffic to border routers with relatively lower loads.

The reference estimated beacon-interval is based on at least one of knowledge of historical estimated beacon-interval, a predefined value set by a manufacturer, a programmable value configured by the network or by the node itself, and a value detected in the beacon packet. If the beacon packet structure has the freedom to embed the information on the reference beacon-interval or the information is distributed via a separate message in the network, upon receiving such information about the estimated beacon-interval of a certain border router, a node can easily figure out if the border router is over-loaded or not, and then the selection becomes more straight-forward at the node side.

In step S606, the selection of one border router as a forwarding border router can be implemented with a heuristic, such as choosing the border router from which the node received the beacon packet first, or choosing the border router from which the node received the beacon packet later than the others, which will result in a non-deterministic time behavior. Or choosing alternately the border router from which the node received the beacon packet in the first place, in the second place, and etc. The pseudo random procedure can also be implemented by the node to generate a pseudo random number first, and mapping the pseudo random number to a certain index or sequence number, and to choose the border router with the corresponding index or sequence number related to the border router identification, or the index or sequence related to the reception of the beacon packet from the border router. The pseudo random procedure can also be a combination of the one or more methods as described above.

Depending on the time duration spent by the node on channel monitoring and the actual beacon-intervals of the border routers in proximity, the node may capture more than two beacon packets from a same border router. In one embodiment, if there are more than two subsequent beacon packets received from the same border router, the estimated beacon-interval is derived based on an average calculation or a median calculation of the time separations between adjacent beacon packets received from the same border router. The more beacon packets the node receives, the better or more accurate estimation on the beacon-interval can be made by the node. The average calculation or a median calculation of the time separations between adjacent beacon packets also helps to filter out any deviation that the border router made on the beacon transmission, such as due to extra delay adopted to avoid a potential conflict with a data packet, or the dither effect applied to the beacon-transmission moments as disclosed above.

Taking traffic load condition at the border router side into consideration when selecting a forwarding border router, is beneficial from system perspective. For an individual node, other parameters may also be critical, especially those related to the application requirements, such as end-to-end delay, SNR and maximum supported data rates on the route. Therefore, it is preferred that under certain circumstance one or more additional criteria are considered as well in the selection, in addition to the consideration regarding load balancing, as shown in optional step S610. The one or more extra criteria can be selected from a list comprising (a) the number of hops on the route from the sensor node to the border router, (b) the average link quality of the route between the sensor node and the border router, (c) the lowest link quality on the route between the sensor node and the border router, (d) the average remaining battery level on the route between the sensor node and the border router, (e) the lowest remaining battery level on the route between the sensor node and the border router.

The methods according to the invention may be implemented on a computer as a computer implemented method, or in dedicated hardware, or in a combination of both.

Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred example, the computer program comprises computer program code means adapted to perform the steps of a method according to the invention when the computer program is run on a computer. Preferably, the computer program is embodied on a computer readable medium.

Methods, systems and computer-readable media (transitory and non-transitory) may also be provided to implement selected aspects of the above-described embodiments.

The term "controller" is used herein generally to describe various apparatus relating to, among other functions, the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A wireless mesh network system comprising:
   at least two border routers configured to connect nodes in the wireless mesh network to an external network, and wherein a border router device comprises:
   a first controller configured to determine a beacon-interval;
   a scheduler configured to determine a beacon-transmission time moment for sending a beacon packet periodically after each beacon-interval;
   a first transceiver configured to transmit the beacon packet on a communication channel at the beacon-transmission time moment;
   wherein the first controller is further configured to determine the beacon-interval based on an available capacity of the border router, wherein the available capacity is related to an actual traffic load of the border router, the actual traffic load comprises reception of data packets with the border router as a destination in the wireless mesh network coming from the nodes in the wireless mesh network either via a direct link or via multi-hop relaying, transmission of the data packets from the border router to the nodes in the wireless mesh network either via the direct link or via multi-hop relaying, and internal processing of the data packets;
   and wherein the higher the actual traffic load the lower the available capacity, and hence the longer the beacon-interval;
   at least one node, and wherein the node comprises:
   a second transceiver configured to monitor a communication channel;
   a second controller; and
   wherein the second controller is configured to derive estimated beacon-intervals of at least two border routers, and to select one border router that has the shortest estimated beacon-interval out of the at least two border routers as a forwarding border router, with the forwarding border router as a destination in the wireless mesh network.

2. A border router device for use in a wireless mesh network, to connect nodes in the wireless mesh network to an external network, comprising:
   a controller configured to determine a beacon-interval;
   a scheduler configured to determine a beacon-transmission time moment for sending a beacon packet periodically after each beacon-interval;
   a transceiver configured to transmit the beacon packet on a communication channel at the beacon-transmission time moment;
   wherein the controller is further configured to determine the beacon-interval based on an available capacity of the border router, wherein the available capacity is related to an actual traffic load of the border router, the actual traffic load comprises reception of data packets with the border router as a destination in the wireless mesh network coming from the nodes in the wireless mesh network either via the direct link or via multi-hop relaying, transmission of the data packets from the border router to the nodes in the wireless mesh network either via the direct link or via multi-hop relaying, and internal processing of the data packets;
   and wherein the higher the actual traffic load the lower the available capacity, and hence the longer the beacon-interval.

3. The border router device of claim 2, wherein the controller is further configured to:
   detect a potential conflict between a scheduled transmission of the beacon packet and a transmission of a data packet of the data packets;
   determine a delay to postpone the scheduled transmission of the beacon packet to avoid the potential conflict;
   and wherein the scheduler is further configured to:
   adjust the beacon-transmission time moment according to the delay determined.

4. A method of a border router in a wireless mesh network, for connecting nodes in the wireless mesh network to an external network, wherein the method comprises the steps of:
   determining a beacon-interval;
   determining a beacon-transmission time moment for sending a beacon packet periodically after each beacon-interval;
   transmitting the beacon packet on a communication channel at the beacon- transmission time moment; and
   determining the beacon-interval based on an available capacity of the border router, wherein the available capacity is related to an actual traffic load of the border router, the actual traffic load comprises reception of data packets with the border router as a destination in the wireless mesh network coming from the nodes in the wireless mesh network either via a direct link or via multi-hop relaying, transmission of the data packets from the border router to the nodes in the wireless mesh network either via the direct link or via multi-hop relaying, and internal processing of the data packets;
   and wherein the higher the actual traffic load the lower the available capacity, and hence the longer the beacon-interval.

5. The method of claim 4, wherein the method further comprises the following steps:
   detecting a potential conflict between a scheduled transmission of the beacon packet and a transmission of a data packet of the data packets;

determining a delay to postpone the scheduled transmission of the beacon packet to avoid the potential conflict;

adjusting the beacon-transmission time moment according to the delay determined.

6. The method of claim 4, wherein the beacon-interval is determined based on a comparison between the actual traffic load and a reference traffic load, and wherein the reference traffic load is set based on at least one of knowledge of historical traffic load, a predefined value set by a manufacturer, and a programmable value configured by a network or by the border router itself; and wherein a load indicator is derived from the comparison by using one of the following steps:

setting the load indicator to a predefined first value if the actual traffic load is lower than or equal to the reference traffic load;

setting the load indicator to a second value by applying one of a step-wise, a linear, a non-linear, or an exponential function to the predefined first value according to the ratio or the difference between the actual traffic load and the reference traffic load.

7. The method of claim 6, wherein the beacon-interval is determined by multiplying a reference beacon-interval with the load indicator, and wherein the reference beacon-interval is set based on at least one of knowledge of historical beacon-interval, the predefined value set by the manufacturer, a programmable value configured by the network or by the border router, and remaining battery level of the border router.

8. A non-transitory computer readable medium comprising code which, when executed by a computer, cause the computer to carry out the method of claim 4.

9. A method of a node in a wireless mesh network to seek for a forwarding border router to an external network, wherein the method comprises the steps of:

monitoring a communication channel;

deriving estimated beacon-intervals of at least two border routers;

selecting one border router that has the shortest estimated beacon-interval out of the at least two border routers as the forwarding border router, with the forwarding border router as a destination in the wireless mesh network;

comparing the estimated beacon-intervals against a reference estimated beacon-interval;

determining if the estimated beacon-intervals from the at least two border routers are all larger or smaller than reference estimated beacon-interval;

selecting randomly one border router out of the at least two border routers as the forwarding border router, if the estimated beacon-intervals from the at least two border routers are all larger or smaller than reference estimated beacon-interval; and wherein the reference estimated beacon-interval is based on at least one of knowledge of historical estimated beacon-interval, a predefined value set by a manufacturer, a programmable value configured by a network or by the node itself, and a value detected in a beacon packet.

10. The method of claim 9, wherein if there are more than two subsequent beacon packets received from the same border router, the estimated beacon-interval is derived based on an average calculation or a median calculation of the time separations between adjacent beacon packets received from the same border router.

11. The method of claim 9, wherein the method further comprises the step of:

selecting one border router of the at least two border routers as the forwarding border router by considering at least one additional criterion from a list of criteria comprising (a) the number of hops on a route from a sensor node to the selected one border router, (b) the average link quality of the route between the sensor node and the selected one border router, (c) the lowest link quality on the route between the sensor node and the selected one border router, (d) the average remaining battery level on the route between the sensor node and the selected one border router, (e) the lowest remaining battery level on the route between the sensor node and the selected one border router.

12. A non-transitory computer readable medium comprising code which, when executed by a computer, cause the computer to carry out the method of claim 9.

* * * * *